(12) United States Patent
Frashure et al.

(10) Patent No.: US 9,802,593 B2
(45) Date of Patent: Oct. 31, 2017

(54) MULTI-PRESSURE VALVE CONTROLLER AND METHOD FOR A VEHICLE BRAKING SYSTEM

(75) Inventors: Timothy J. Frashure, Columbia Station, OH (US); Robert J. Custer, Westlake, OH (US); Richard J. Conklin, Bay Village, OH (US)

(73) Assignee: Bendix Commercial Vehicle Systems LLC, Elyria, OH (US)

(*) Notice: Subject to any disclaimer, the term of this patent is extended or adjusted under 35 U.S.C. 154(b) by 678 days.

(21) Appl. No.: 13/154,641

(22) Filed: Jun. 7, 2011

(65) Prior Publication Data

US 2012/0312645 A1  Dec. 13, 2012

(51) Int. Cl.
| | |
|---|---|
| *B60T 8/17* | (2006.01) |
| *B60T 13/68* | (2006.01) |
| *B60T 13/66* | (2006.01) |
| *B60T 8/24* | (2006.01) |
| *B60T 8/34* | (2006.01) |

(52) U.S. Cl.
CPC ............. *B60T 13/683* (2013.01); *B60T 8/243* (2013.01); *B60T 8/34* (2013.01); *B60T 13/662* (2013.01)

(58) Field of Classification Search
CPC ......... B60T 8/342; B60T 8/362; B60T 8/4818
USPC ............ 303/3, 7, 127, 155, 139, 156, 113.1, 303/113.2, 118.1
See application file for complete search history.

(56) References Cited

U.S. PATENT DOCUMENTS

| | | |
|---|---|---|
| 1,644,568 A | 10/1927 | Dapron |
| 3,795,423 A | 3/1974 | Shields et al. |
| 3,976,335 A | 8/1976 | Sekiguchi |
| 4,626,043 A | 12/1986 | Belart et al. |
| 4,824,181 A | 4/1989 | Tomala |
| 5,342,119 A | 8/1994 | Smith et al. |
| 5,632,306 A | 5/1997 | Taka |
| 5,862,503 A | 1/1999 | Eckert et al. |
| 5,882,090 A | 3/1999 | Ganzel |
| 6,106,080 A * | 8/2000 | Tozu et al. ................. 303/116.1 |
| 6,149,246 A | 11/2000 | Terborn et al. |

(Continued)

FOREIGN PATENT DOCUMENTS

| | | |
|---|---|---|
| DE | 10307584 A1 | 9/2004 |
| DE | 102009016982 A1 | 11/2010 |

(Continued)

OTHER PUBLICATIONS

International Search Report for International Application No. PCT/EP2012/052898, dated Jun. 22, 2012.

(Continued)

*Primary Examiner* — Bradley King
(74) *Attorney, Agent, or Firm* — Brian E. Kondas; Cheryl L. Greenly; Eugene E. Clair (57) ABSTRACT

A vehicle braking system includes a brake associated with a respective wheel of the vehicle, a multi-pressure valve associated with the brake, and a controller electrically communicating with the multi-pressure valve. The multi-pressure valve receives fluid at a first pressure at a supply port and is capable of delivering the fluid at a delivery port at a plurality of pressure profiles. A control signal is transmitted to the multi-pressure valve. The multi-pressure valve delivers the pressurized fluid to the brake, via the delivery port, at one of the plurality of delivery pressure profiles based on the control signal.

18 Claims, 3 Drawing Sheets

(56) References Cited

U.S. PATENT DOCUMENTS

| | | | |
|---|---|---|---|
| 6,234,583 B1 | 5/2001 | Eckert | |
| 6,312,064 B1* | 11/2001 | Koike | B60K 31/107 303/116.1 |
| 7,020,551 B2 | 3/2006 | Goebels et al. | |
| 7,188,913 B2* | 3/2007 | Yokoyama et al. | 303/113.4 |
| 7,415,341 B2 | 8/2008 | Goebels et al. | |
| 7,517,026 B1* | 4/2009 | Herbst et al. | 303/3 |
| 7,520,572 B2 | 4/2009 | Hatipoglu et al. | |
| 7,577,509 B2 | 8/2009 | Goebels et al. | |
| 2005/0179314 A1 | 8/2005 | Csak et al. | |
| 2006/0152075 A1 | 7/2006 | Goebels et al. | |
| 2007/0236084 A1* | 10/2007 | Frank et al. | 303/119.2 |
| 2012/0217794 A1* | 8/2012 | Wieder et al. | 303/113.2 |

FOREIGN PATENT DOCUMENTS

| | | |
|---|---|---|
| DE | 102011012270 A1 | 8/2012 |
| EP | 0604864 A2 | 7/1994 |

OTHER PUBLICATIONS

Written Opinion for International Application No. PCT/EP2012/052898, dated Jun. 22, 2012.

Bendix ATR-6 and ATR-3 Antilock Traction Relay Valves, Bendix Service Data Sheet No. SD-13-4861, BW2598, Apr. 2008.

\* cited by examiner

MULTI-PRESSURE VALVE CONTROLLER AND METHOD FOR A VEHICLE BRAKING SYSTEM

BACKGROUND

The present invention relates to a multi-pressure valve and a controller and method for controlling the multi-pressure valve. It finds particular application in conjunction with a braking system and will be described with particular reference thereto. It will be appreciated, however, that the invention is also amenable to other applications.

Some vehicles (e.g., heavy vehicles such as trucks and buses) rely on fluid pressure (e.g., air pressure) for operating a braking system on the vehicle. Various control systems on the vehicle (e.g., adaptive cruise with braking (ACB) systems, antilock braking systems (ABS), hill holding system, traction control systems etc.) may actuate various brakes on the vehicle, via an electronic control unit (ECU), for avoiding collisions, stabilizing the vehicle, holding the vehicle on a hill, and/or increasing traction for the vehicle. Currently, the ECU causes full braking pressure to be applied when any of the control systems calls for one or more of the vehicle brakes to be applied. Depending on the circumstances, it may be desirable to apply less than full pressure (e.g., half-pressure).

The present invention provides a new and improved apparatus and method which addresses the above-referenced problems.

SUMMARY

In one aspect of the present invention, it is contemplated that a vehicle braking system includes a brake associated with a respective wheel of the vehicle, a multi-pressure valve associated with the brake, and a controller electrically communicating with the multi-pressure valve. The multi-pressure valve receives fluid at a first pressure at a supply port and is capable of delivering the fluid at a delivery port at a plurality of pressure profiles. A control signal is transmitted to the multi-pressure valve. The multi-pressure valve delivers the pressurized fluid to the brake, via the delivery port, at one of the plurality of delivery pressure profiles based on the control signal.

BRIEF DESCRIPTION OF THE DRAWINGS

In the accompanying drawings which are incorporated in and constitute a part of the specification, embodiments of the invention are illustrated, which, together with a general description of the invention given above, and the detailed description given below, serve to exemplify the embodiments of this invention.

DETAILED DESCRIPTION OF ILLUSTRATED EMBODIMENT

Figure 1:
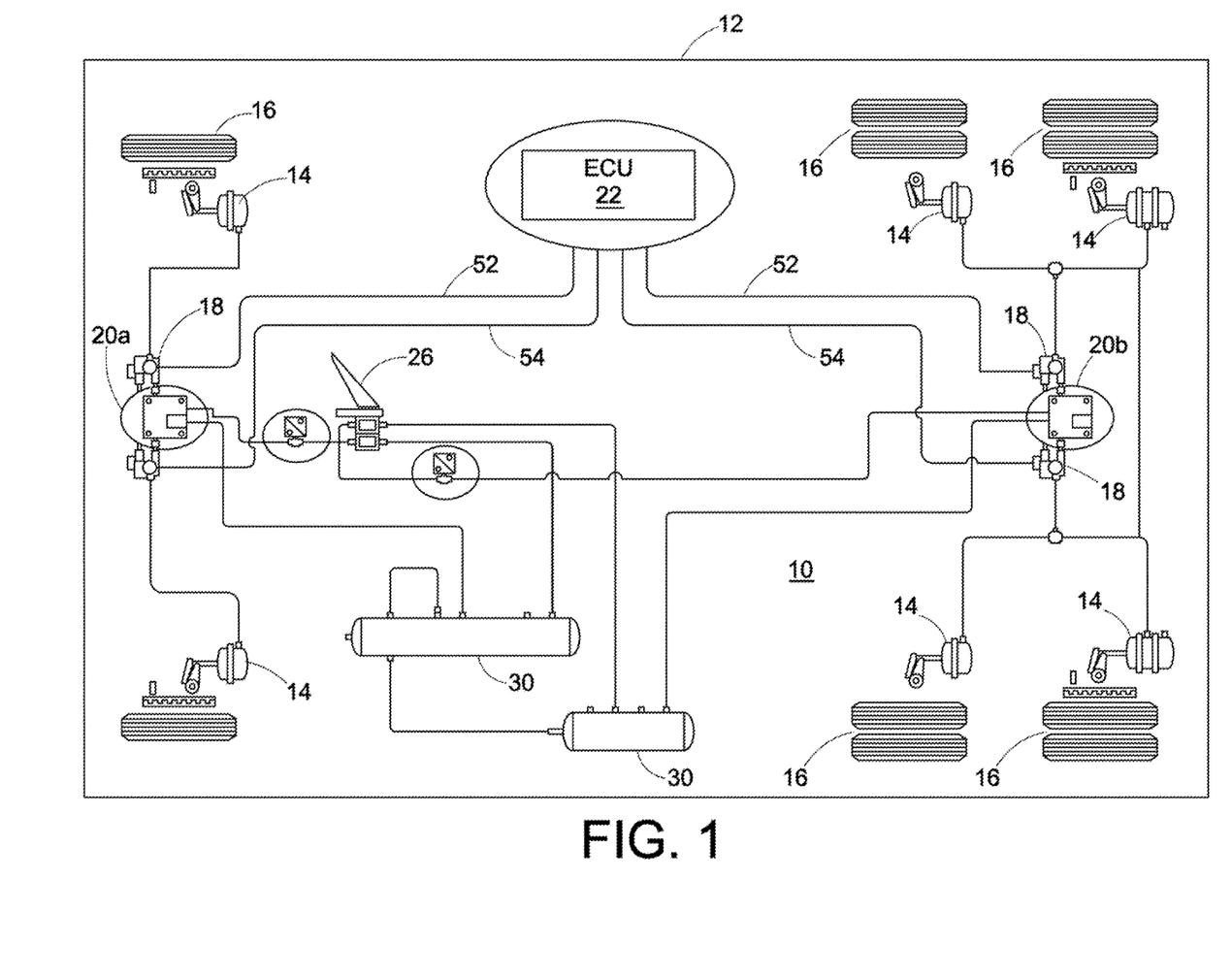
FIG. 1 illustrates a schematic representation of a vehicle including a braking system in accordance with one embodiment of an apparatus illustrating principles of the present invention.

With reference to FIG. 1, a simplified component diagram of an exemplary vehicle braking system 10 of a vehicle 12 is illustrated in accordance with one embodiment of the present invention. The vehicle braking system 10 includes a plurality of brakes 14 associated with respective wheels 16 of the vehicle 12. A plurality of modulators 18 are associated with respective ones of the brakes 14 and a plurality of multiple pressure (multi-pressure) valves 20a, 20b are associated with the modulators 18. It is contemplated that one of the multi-pressure valves 20a is associated with the front axle(s) of the vehicle 12 and another one of the multi-pressure valves 20b is associated with the rear axle of the vehicle 12. A trailer multi-pressure valve is also contemplated, but not illustrated in the figures. An electronic controller 22 (e.g., an electronic control unit (ECU)) electrically communicates with the multiple pressure valves 20a, 20b. Sensors electrically communicate with the ECU 22 and measure, for example, the speed of the vehicle 12, a yaw of the vehicle 12, and/or the amount of service brake pressure that is requested when, for example, a service brake pedal 26 is depressed. The ECU 22 transmits at least one control signal (e.g., an electronic control signal) to one or both of the multiple pressure valves 20a, 20b for controlling respective states (e.g., a first state and a second state) of the respective valves 20a, 20b based on signals received from the various sensors. Reservoirs 30 store a pressurized fluid (e.g., compressed air).

Figure 2:
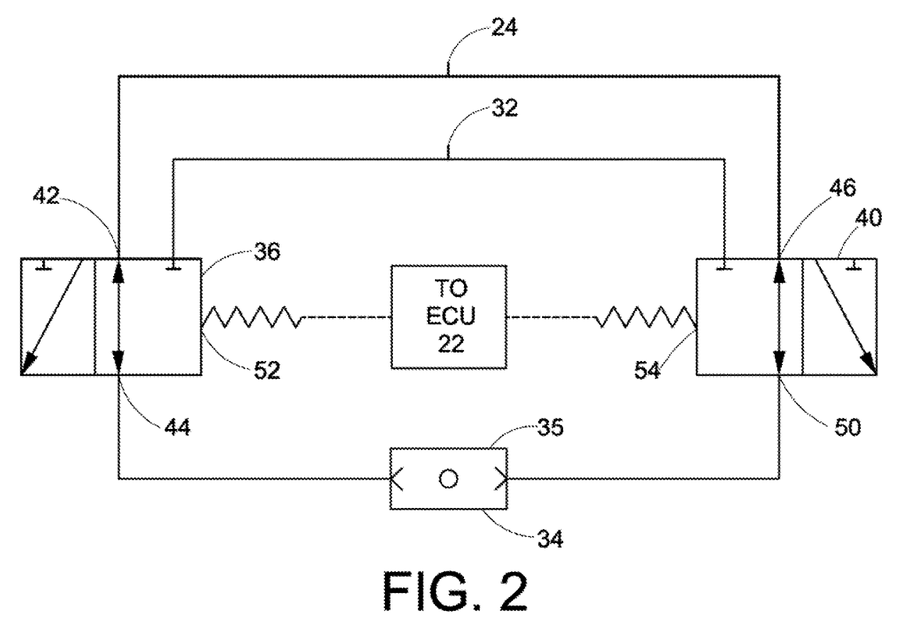
FIG. 2 illustrates a schematic representation of a valve in accordance with one embodiment of an apparatus illustrating principles of the present invention.

FIG. 2 illustrates one of the multiple pressure valves 20 (e.g., 20a). Although FIG. 2 only illustrates one of the multiple pressure valves 20a, it is to be understood that the other multiple pressure valve 20b includes the same structure and operates in the same manner as the multiple pressure valve 20a. Each of the multiple pressure valves 20a includes a respective reservoir supply port 32, which receives pressurized fluid (e.g., compressed air) from the reservoir 30 (see FIG. 1), and a service brake pedal supply port 24, which receives pressurized fluid (e.g., compressed air) from the reservoir 30 when an operator of the vehicle 12 depresses the service brake pedal 26. Each of the multiple pressure valves 20a also includes a respective valve delivery port 34 that delivers the pressurized fluid to the respective associated brake 14 (see FIG. 1).

In one embodiment, each of the multiple pressure valves 20a includes a plurality of sub-valves. For example, the illustrated embodiment includes first and second sub-valves 36, 40, respectively. The first sub-valve 36 includes a supply port 42, which fluidly communicates with the brake pedal supply port 24 when the first sub-valve 36 is in a first state, and, which fluidly communicates with the reservoir supply port 32 when the first sub-valve 36 is in a second state. The first sub-valve 36 also includes a delivery port 44, which fluidly communicates with the valve delivery port 34 via a double-check valve 35. The second sub-valve 40 includes a supply port 46, which fluidly communicates with the brake pedal supply port 24 when the second sub-valve 40 is in a first state, and which fluidly communicates with the reservoir supply port 32 when the second sub-valve 40 is in a second state. The second sub-valve 40 also includes a delivery port 50, which fluidly communicates with the valve delivery port 34 via the double-check valve 35. The sub-valves 36, 40 are illustrated as internal valves of the multiple pressure valves 20a; however, other embodiments are contemplated. In addition, it is contemplated that the sub-valves 36, 40 are in a pneumatically parallel arrangement between the brake pedal supply port 24 and the delivery port 34, and in a pneumatically parallel arrangement between the reservoir supply port 32 and the delivery port 34.

It is to be understood that the control signal may include sub-control signals to the respective sub-valves 36, 40 of the multiple pressure valves 20a. In addition, the term control signal may be used to describe a plurality of control signals transmitted in a series (e.g., in a pattern) to one, or both, of the sub-valves 36, 40.

In one embodiment, the sub-valves 36, 40 are electromechanical valves (e.g., solenoid valves). It is contemplated that the sub-valves 36, 40 are each set between the first state and the second state based on the respective control signals. For each of the sub-valves 36, 40, the respective sub-valve supply port 42, 46 (and the respective sub-valve delivery ports 44, 50) fluidly communicate with the brake pedal supply port 24 and the valve delivery port 34 (via the double-check valve 35) while the respective sub-valve 36, 40 is in the first state. Also, for each of the sub-valves 36, 40, the respective sub-valve supply port 42, 46 fluidly communicates (and the respective sub-valve delivery ports 44, 50) fluidly communicate with the reservoir supply port 32 and the valve delivery port 34 (via the double-check valve 35) while the respective sub-valve 36, 40 is in the second state.

The multiple pressure valves 20a, 20b are considered to be in the first state when all of the respective sub-valves 36, 40 are in the first state. If any of the sub-valves 36, 40 within a particular multiple pressure valve 20a, 20b is in the second state, the respective multiple pressure valve 20a, 20b is considered to be in the second state.

The first and second sub-valves 36, 40 receive the pressurized fluid at the respective sub-valve supply ports 42, 46 from the fluid source 30. When the first sub-valve 36 is in the first state, the pressure at the delivery port 44 is substantially the same pressure at the brake pedal supply port 24. When the first sub-valve 36 is in the second state, the pressure at the delivery port 44 is substantially the same pressure as the reservoir supply port 32. When the second sub-valve 40 is in the first state, the pressure at the delivery port 50 is substantially the same pressure as the brake pedal supply port 24. When the second sub-valve 40 is in the second state, the pressure at the delivery port 50 is less than the pressure at the reservoir supply port 32. For example, the pressure at the delivery port 50 is about one-half (½) of the pressure at the reservoir supply port 32. In this embodiment, it is contemplated that the second sub-valve 40 includes an internal pressure reducing valve (not illustrated) to deliver reduced pressure to the delivery port 50.

The first and second sub-valves 36, 40 receive respective control signals, via electrical conductors 52, 54, from the ECU 22. Since the first and second sub-valves 36, 40 are not illustrated in FIG. 1, the electrical conductors are referenced as 52/54 in FIG. 1. With reference again to FIG. 2, the ECU 22 transmits the control signals to the first and second sub-valves 36, 40, respectively, via the electrical conductors 52, 54 based on a desired braking profile. Different braking profiles are desired in different braking situations.

Figure 3:
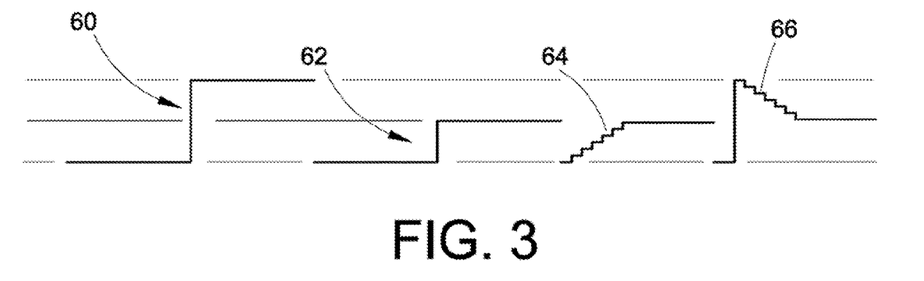
FIG. 3 illustrates representations of braking profiles in accordance with one embodiment of the present invention.

With reference to FIGS. 2 and 3, four (4) different braking profiles are discussed.

The default state for both the first and second sub-valves 36, 40 is the first state. In the default (i.e., first state), the pressure at the delivery port 34 is controlled by how much, if any, the service brake pedal 26 is depressed.

A first braking profile 60 is initiated when, for example, the ECU 22 determines full braking pressure is required. According to this profile, the full demanded braking pressure is continuously delivered. In other words, the full available pressure at the reservoir supply port 32 of the multiple pressure valve 20a (and/or 20b) is continuously delivered at the delivery port 34. Therefore, the first braking profile 60 is referred to as a "continuous full pressure application" profile. To achieve the continuous full pressure application profile, the ECU 22 transmits a control signal to set the first sub-valve 36 to the second state; the ECU 22 maintains the second sub-valve 40 in the first state. It is also contemplated that the ECU 22 may transmit control signals to set both the first sub-valve 36 and the second sub-valve 40 to the second states to ensure that the highest of the two pressures is delivered. In the first braking profile 60, the ECU 22 may transmit signals to set only some or all of the first sub-valves 36 of the multiple pressure valves 20a (and/or 20b) to the second state. The first braking profile 60 may be used, for example, during an anti-lock braking event while the modulators 18 are cycled to achieve a desired braking effect. The first braking profile 60 may also be used, for example, during a collision mitigation technology (CMT) event. The modulators 18 may or may not be cycled to achieve a desired braking effect.

A second braking profile 62 is initiated when, for example, the ECU 22 determines a hill start assistance (HSA) function is activated. According to this profile, a reduced braking pressure is continuously delivered at the multiple pressure valve 20a (and/or 20b) delivery port 34. In one embodiment it is contemplated that the second braking profile of continuous reduced delivery pressure 62 is about one-half (½) of the pressure at the supply port 46. Therefore, the second braking profile is referred to as a "continuous reduced pressure application" profile. To achieve the continuous reduced pressure application profile, the ECU 22 transmits a control signal to set the second sub-valve 40 to the second state; the ECU 22 maintains the first sub-valve 36 in the first state. In this profile, the ECU 22 transmits signals to set only some, or all, of the second sub-valves 40 of the multiple pressure valves 20a (and/or 20b) to the second state. In one embodiment, the HSA function is only performed on the rear axle by setting the second sub-valve 40 of the rear multiple pressure valve 20b to the second state. Providing an HSA function using the multiple pressure valves 20a, 20b may eliminate the necessity of a separate HSA controller. The second braking profile 62 may also be used during certain types of automatic traction control (ATC) events, in which case the modulators 18 may be cycled.

A third braking profile 64 is initiated when, for example, the ECU 22 determines an adaptive cruise with braking (ACB) function is activated. According to this profile, a reduced braking pressure (e.g., one-half (½)) is delivered at the multiple pressure valve 20a (and/or 20b) delivery port 34. However, in one embodiment it is contemplated that the third braking profile 64 differs from the second profile 62 in that the low pressure is delivered to the delivery port 34 in a stepped (as opposed to a continuous) manner. Therefore, the third braking profile 64 is referred to as a "stepped-up pressure application" profile. To achieve the stepped-up pressure application profile 64, the ECU 22 maintains the first sub-valve 36 in the first state; the ECU 22 also transmits control signals to set the second sub-valve 40 to alternately switch the second sub-valve 40 between the first and second states (so that modulators 18 may not need to be activated). Therefore, the initial pressure at the multiple pressure valve 20*a* (and/or 20*b*) delivery port 34 is substantially zero (0), but increases in a stepped manner up to the reduced braking pressure. Once the desired reduced pressure (e.g., one-half (½) of the delivery pressure) is achieved at the delivery port 34, the ECU 22 transmits a control signal to the second sub-valve 40 to maintain the second sub-valve 40 in the second state. In this profile, the ECU 22 transmits signals to set either all, or only some, of the multiple pressure valves 20*a* (and/or 20*b*) to the third braking profile, as required by the ACB function. Although the third braking profile is only described as stepping-up to the reduced pressure at the multiple pressure valve 20*a* (and/or 20*b*) delivery port 34, other profiles are also contemplated that would begin at either zero (0) pressure or the reduced pressure, and step-up to half pressure at the multiple pressure valve 20 *a* (and/or 20*b*) delivery port 34. At the end of a braking profile, the pressure is exhausted via, for example, the brake pedal supply port 24 or other quick exhaust in the supply line. To achieve ACB braking, all wheel axles (e.g., both the front and rear multiple pressure valves 20*a*, 20*b*) are set to the third braking profile. For the third braking profile 64, the modulators 18 may be used to hold and release the delivery air to achieve the stepped profile.

A fourth braking profile 66 is initiated when, for example, the ECU 22 determines a low level vehicle stability intervention (e.g., electronic stability or roll protection) is activated. According to this profile, a reduced stepped braking pressure (e.g., one-half (½)) is delivered at both of the multiple pressure valve 20*a*, 20*b* delivery ports 34. However, in one embodiment for a high level vehicle stability intervention it is contemplated that the fourth braking profile 66 differs from third braking profile 64 in that the stepped pressure begins at the full pressure (e.g., the pressure at the delivery port 34 is initially the same pressure at the reservoir supply port 32), but is reduced (e.g., down to one-half braking pressure in a stepped manner. Therefore, the fourth braking profile 66 is referred to as a "stepped-down pressure application" profile. To achieve the stepped full pressure application profile 66, the ECU 22 transmits a control signal to set the first sub-valve 36 to the second state for a period of time to allow the delivery port 34 to achieve the same pressure as the reservoir 30; the ECU 22 also maintains the second sub-valve 40 in the first state. Once the full pressure is achieved at the delivery port 34, the ECU 22 transmits control signals to alternately set the first sub-valve 36 between the first state and the second state. Alternately setting the first sub-valve 36 between the first and second states results in the stepped decrease in pressure of the fourth braking profile 66 at the delivery port 34. In this profile, the ECU 22 transmits signals to set either all, or only some, of the multiple pressure valves 20*a*, 20*b* to the fourth braking profile, as required by the stability function. For the fourth braking profile 66, the modulators 18 may be used to hold and release the delivery air to achieve the stepped profile.

Figure 4:
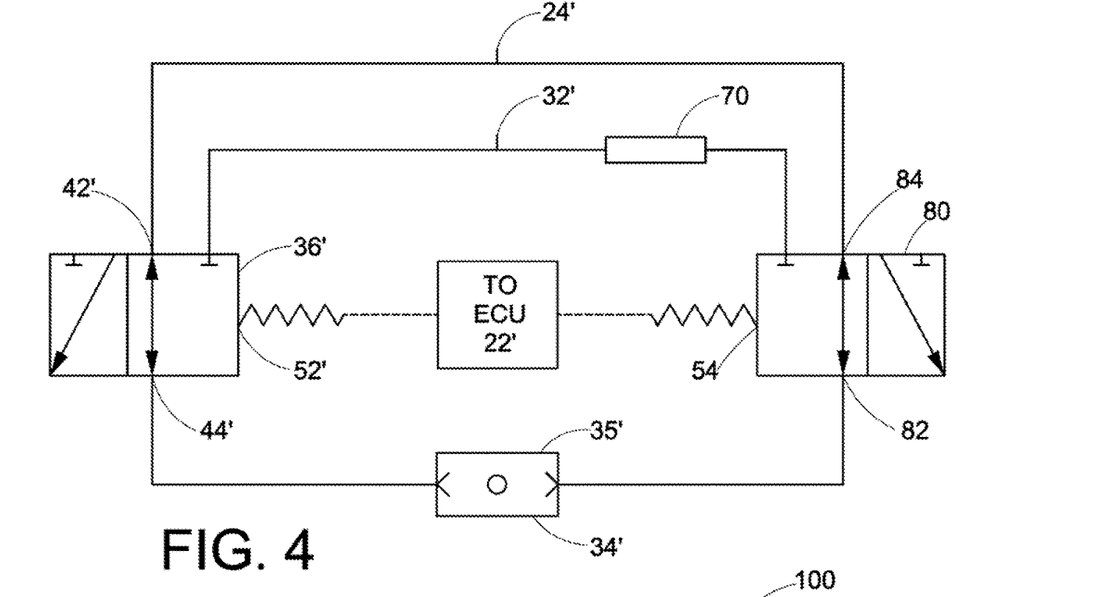
FIG. 4 illustrates a schematic representation of a valve in accordance with a second embodiment of an apparatus illustrating principles of the present invention.

With reference to FIG. 4, a simplified component diagram of a multiple pressure valve is illustrated in accordance with a second embodiment of the present invention. For ease of understanding this embodiment of the present invention, like components are designated by like numerals with a primed (') suffix and new components are designated by new numerals. Although FIG. 4 only illustrates one of the multiple pressure valves 20*a*', it is to be understood that the other multiple pressure valve 20*b*' includes the same structure and operates in the same manner as the multiple pressure valve 20*a*'.

In the multi-pressure valve 20*a*' illustrated in FIG. 4, both of the sub-valves 36', 80 provide substantially the same pressure at their respective delivery ports 44', 82 when the valves 36', 80 are in the first state. For example, the sub-valves 36', 80 pass substantially the same pressures from the supply ports 42', 84 to the respective delivery ports 44', 82. A pressure reducer 70 is arranged pneumatically in series with, and upstream of, the second sub-valve 80. The pressure reducer 70 receives the pressurized air from the reservoir supply port 32' and provides a reduced pressure (e.g., about one-half (½) of the pressure) to the supply port 84 of the second sub-valve 80 of the multi-pressure valve 20*a*'. Therefore, when the second sub-valve 80 is in the second state, the pressure provided to the delivery port 34' of the multi-pressure valve 20' by the second sub-valve 80 is less than the pressure provided at the reservoir supply port 32'.

Figure 5:
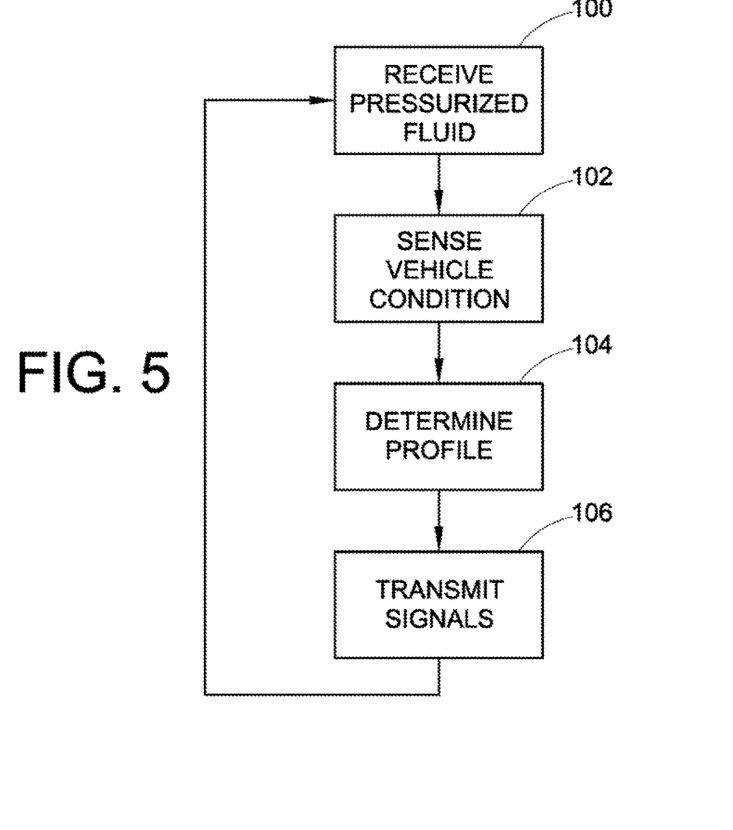
FIG. 5 is an exemplary methodology of braking in accordance with one embodiment illustrating principles of the present invention.

With reference to FIG. 5, an exemplary methodology of the system shown in FIGS. 1-4 for controlling delivery pressure to a vehicle system is illustrated. As illustrated, the blocks represent functions, actions and/or events performed therein. It will be appreciated that electronic and software systems involve dynamic and flexible processes such that the illustrated blocks and described sequences can be performed in different sequences. It will also be appreciated by one of ordinary skill in the art that elements embodied as software may be implemented using various programming approaches such as machine language, procedural, object-oriented or artificial intelligence techniques. It will further be appreciated that, if desired and appropriate, some or all of the software can be embodied as part of a device's operating system.

In a Step 100, the pressurized fluid is received into the supply port of the multiple pressure valve 20*a* (and/or 20*b*), which is associated with the reservoir 30. In a Step 102, a condition of the vehicle 12 is sensed. For example, a traction control braking event, a hill start assistance (HSA) event, an adaptive cruise with braking (ACB) event, or a vehicle stability event is sensed. A braking profile is determined and set in a Step 104 based on the vehicle condition. A pattern of control signals is transmitted, in a step 106, from a controller 22 to the multiple pressure valve 20*a* (and/or 20*b*), based on the braking profile, to achieve a desired profile of braking pressures. Control then returns to the step 100.

In one embodiment, the step 104 of transmitting the control signals includes transmitting signals to a plurality of sub-valves 36, 40 of the multiple pressure valve 20*a* (and/or 20*b*) to control the sub-valves for achieving the desired braking pressure profile. For example, if a continuous full pressure profile braking pressure is desired, the control signals are transmitted to set the first sub-valve 36 of the multiple pressure valve 20*a* (and/or 20*b*) to the second state and to maintain the second sub-valve 40 of the multiple pressure valve 20*a* (and/or 20*b*) in the first state. If a continuous reduced pressure profile braking pressure is desired, the control signals are transmitted to maintain the first sub-valve 36 of the multiple pressure valve 20*a* (and/or 20*b*) in the first state and to set the second sub-valve 40 of the multiple pressure valve 20*a* (and/or 20*b*) to the second state. If a stepped-up braking pressure is desired, the control signals are transmitted to maintain the first sub-valve 36 of the multiple pressure valve 20*a* (and/or 20*b*) in the first state and to alternately set the second sub-valve 40 of the multiple pressure valve 20*a* (and/or 20*b*) between the first state and the second state to step-up the delivery pressure until the desired pressure is achieved the control signals maintain the second sub-valve 40 in the second state. If a stepped-down braking pressure profile is desired, the control signals are transmitted to set the first sub-valve 36 of the multiple pressure valve 20a (and/or 20b) to the second state and to maintain the second sub-valve 40 of the multiple pressure valve 20a (and/or 20b) in the first state until, for example, full pressure is achieved; once the full pressure is achieved the control signals alternately set the first sub-valve 36 between the first and second states and maintains the second sub-valve 40 in the first state until the delivery pressure is stepped-down to the desired reduced pressure.

While the present invention has been illustrated by the description of embodiments thereof, and while the embodiments have been described in considerable detail, it is not the intention of the applicants to restrict or in any way limit the scope of the appended claims to such detail. Additional advantages and modifications will readily appear to those skilled in the art. Therefore, the invention, in its broader aspects, is not limited to the specific details, the representative apparatus, and illustrative examples shown and described. Accordingly, departures may be made from such details without departing from the spirit or scope of the applicant's general inventive concept.

We claim:

1. A vehicle braking system, the system comprising:
   a brake associated with a respective wheel of the vehicle;
   a multi-pressure valve associated with the brake, the multi-pressure valve receiving fluid at a first pressure at a first supply port and a second pressure at a second supply port, the multi-pressure valve being capable of delivering and maintaining the fluid at a delivery port of the multi-pressure valve at a respective one of a plurality of discrete pressure profiles determined based on a desired braking situation, the multi-pressure valve including:
      a plurality of electromechanical sub-valves that receive the pressurized fluid at the first pressure from the first supply port, receive the pressurized fluid at the second pressure from the second supply port, and deliver respective delivery pressures based on respective states of the electromechanical sub-valves, the delivery pressure of a first of the sub-valves being one of the first pressure and the second pressure, the delivery pressure of a second of the sub-valves being one of a reduced pressure of the first pressure and a reduced pressure of the second pressure; and
   a controller, electrically communicating with the sub-valves of the multi-pressure valve, transmitting a control signal based on the desired braking situation and including respective sub-control signals to the sub-valves, each of the sub-valves being set to a respective one of the plurality of the states based on the sub-control signal, the multi-pressure valve delivering the pressurized fluid to the brake, via the delivery port, at one of the plurality of delivery pressure profiles, the discrete delivery pressure profile being selected by setting the respective states of the sub-valves during the desired braking situation so that the pressurized fluid delivered from the multi-pressure valve to the brake is maintained during the desired braking situation.

2. The vehicle braking system as set forth in claim 1, wherein:
   the plurality of electromechanical sub-valves are in a pneumatically parallel arrangement.

3. The vehicle braking system as set forth in claim 2, wherein:
   the plurality of electromechanical sub-valve are defaulted to a first of the states;
   the first of the electromechanical sub-valves is set to the second state, based on the respective first of the sub-control signals, to deliver the second of the respective delivery pressures; and
   the second of the electromechanical valves is set to the second state, based on the respective second of the sub-control signals, to deliver the reduced pressure of the second pressure.

4. The vehicle braking system as set forth in claim 3, wherein:
   the controller transmits the control signal to not set the first and second electromechanical valves to the respective second states simultaneously.

5. The vehicle braking system as set forth in claim 1, wherein the electromechanical valves are solenoid valves.

6. The vehicle braking system as set forth in claim 2, wherein a first of the electromechanical valves and a second of the electromechanical valves deliver substantially the same respective delivery pressures, the valve further including:
   a pressure reducer arranged in series with the second electromechanical valve.

7. The vehicle braking system as set forth in claim 1, wherein:
   the respective delivery pressures from each of the electromechanical sub-valves is greater than zero.

8. A vehicle braking system, the system comprising:
   a brake associated with a respective wheel of the vehicle;
   a multi-pressure valve associated with the brake, the multi-pressure valve receiving fluid at a first pressure at a supply port and being capable of delivering the fluid at a delivery port at a plurality of pressure profiles, the multi-pressure valve including a plurality of electromechanical sub-valves, in a pneumatically parallel arrangement and defaulted to a first state, that receive the pressurized fluid at the first pressure and deliver respective delivery pressures;
   a controller, electrically communicating with the multi-pressure valve, transmitting a control signal to the multi-pressure valve, the multi-pressure valve delivering the pressurized fluid to the brake, via the delivery port, at one of the plurality of delivery pressure profiles based on the control signal, the control signal including a plurality of sub-control signals for the respective plurality of sub-valves;
   a first of the electromechanical sub-valves is set to a second state, based on a respective first of the sub-control signals, to deliver the first of the respective delivery pressures;
   a second of the electromechanical valves is set to a second state, based on a respective second of the sub-control signals, to deliver a second of the respective delivery pressures, the first delivery pressure being higher than the second delivery pressure;
   the controller is configured to transmit the control signal to set the first sub-valve to the second state to deliver the pressurized fluid at the delivery port according to a continuous full pressure profile, which is one of the delivery pressure profiles;
   the controller is configured to transmit the control signal to set the second sub-valve to the second state to deliver the pressurized fluid at the delivery port according to a continuous reduced pressure profile, which is one of the delivery pressure profiles;
   the controller is configured to transmit the control signal to alternately set the second sub-valve to between the first state and the second state to deliver the pressurized fluid at the delivery port according to a stepped-up pressure profile, which is one of the delivery pressure profiles; and the controller is configured to transmit the control signal to set the first sub-valve to the second state until the full pressure is achieved at the delivery port, the controller then transmits the control signal to alternately set the first sub-valve between the first and second states until a reduced pressure is achieved at the delivery port to deliver the pressurized fluid at the delivery port according to a stepped-down pressure profile, which is one of the delivery pressure profiles.

9. The vehicle braking system as set forth in claim 3, further including:

a modulator, the controller controlling the modulator to achieve various stepped-up and stepped-down pressure profile applications of the fluid at the delivery port.

10. The vehicle braking system as set forth in claim 8, wherein:

the continuous full pressure profile application of the fluid at the delivery port is used during a traction control braking event;

the continuous reduced pressure profile application of the fluid at the delivery port is used during a hill start assistance (HSA) function;

the stepped-up pressure profile application of the fluid at the delivery port is used during an adaptive cruise with braking (ACB) function; and the stepped-down pressure profile application of the fluid at the delivery port is used during a vehicle stability function.

11. The vehicle braking system as set forth in claim 1, wherein:

the controller transmits a series of the control signals to the valve, the valve delivering various ones of a plurality of delivery pressures, based on the respective control signal, to the brake.

12. A controller for controlling delivery pressure of a fluid to a vehicle system, the controller comprising:

at least one electronic input receiving signals indicating a condition of the vehicle and a deceleration request, the condition of the vehicle including at least one of a speed of the vehicle, a yaw of the vehicle, and an amount of requested service brake pressure; and electronics configured to determine a discrete one of a plurality of braking profiles, to deliver one of full braking pressure and reduced braking pressure, for a single braking circuit based on at least one of the condition of the vehicle and the deceleration request, the electronics configured to transmit a control signal including respective sub-control signals to sub-valves of a multi-pressure valve providing a braking pressure application to the single braking circuit, each of the sub-valves receiving the fluid at a reservoir pressure at respective first sub-valve supply ports and a service brake pressure at respective second sub-valve supply ports, each of the sub-valves delivering respective delivery pressures, the sub-control signals setting respective states of the sub-valves to achieve the braking pressure application based on the discrete braking profile and controlling the sub-valves to maintain the discrete braking profile in the single braking circuit;

the electronics being configured to:

transmit the control signal to set a first of the sub-valves to a second state and to maintain a second of the sub-valves in a first state to deliver a continuous full pressure braking profile;

transmit the control signal to maintain the first sub-valve in a first state and to set the second sub-valve to a second state to deliver a continuous reduced pressure braking profile;

transmit the control signal to maintain the first sub-valve in the first state and to alternately set the second sub-valve between the first state and the second state to deliver a stepped-up pressure braking profile; and transmit the control signal to set the first sub-valve to the second state and to maintain the second sub-valve in the first state until the full pressure is achieved, the electronics then transmit the control signal to alternately set the first sub-valve between the first and second states and to maintain the second sub-valve to the first state to deliver a stepped-down pressure braking profile.

13. The controller as set forth in claim 12, further including:

a modulator, the electronics are configured to transmit control signals to the modulator to achieve a plurality of respective stepped-up and stepped-down pressure braking profiles.

14. The controller as set forth in claim 12, wherein:

the continuous full pressure braking profile is used during a traction control braking event;

the continuous reduced pressure braking profile is used during a hill start assistance (HSA) function;

the stepped-up pressure braking profile is used during an adaptive cruise with braking (ACB) function; and the stepped-down pressure profile application is used during a vehicle stability function.

15. A method for controlling delivery pressure of a fluid to a vehicle system, the method comprising:

receiving signals, at least one electronic input, indicating a condition of the vehicle and a deceleration request;

determining a discrete braking profile, to deliver one of full braking pressure and reduced braking pressure, for a single braking circuit based on at least one of the condition of the vehicle and the deceleration request; and transmitting a control signal including respective sub-control signals to sub-valves of a multi-pressure valve providing a braking pressure application to the single braking circuit, each of the sub-valves receiving the fluid at a reservoir pressure at respective first sub-valve supply ports and a service brake pressure at respective second sub-valve supply ports, each of the sub-valves delivering respective delivery pressures, the sub-control signals setting respective states of the sub-valves to select one of the supply ports on each of the sub-valves to achieve the braking pressure application based on the discrete braking profile and maintaining the discrete braking profile in the single braking circuit, the transmitting step including:

transmitting the control signal to the multi-pressure valve to achieve a continuous full pressure braking profile by setting a first of the sub-valves to a second state and maintaining a second of the sub-valves in a first state;

transmitting the control signal to the multi-pressure valve to achieve a continuous reduced pressure braking profile by maintaining the first sub-valve in a first state and setting the second sub-valve to a second state;

transmitting the control signal to the multi-pressure valve to achieve a stepped-up pressure braking profile by maintaining the first sub-valve in a first state and alternately setting the second sub-valve between the first state and the second state; and transmitting the control signal to the multi-pressure valve to achieve a stepped-down pressure braking profile by setting the first sub-valve to the second state and maintaining the second sub-valve in the first state until the full pressure is achieved, and then alternately setting the first sub-valve between the first and second states and maintaining the second sub-valve in the first state until a reduced pressure is achieved.

16. The method for controlling delivery pressure of a fluid to a vehicle system as set forth in claim 15, wherein the transmitting step includes:

transmitting the control signal to a modulator to achieve a plurality of respective stepped-up and stepped-down pressure braking profiles.

17. A method for controlling delivery pressure of a fluid to a vehicle system, the method comprising:

receiving a pressurized fluid into each of a plurality of supply ports of each of a plurality of respective sub-valves of a multi-pressure valve, which provides a braking pressure application to a single braking circuit, from of a valve associated with a brake, each of the sub-valves receiving the pressurized fluid at a reservoir pressure at respective first sub-valve supply ports and a service brake pressure at respective second sub-valve supply ports and delivering respective delivery pressures;

sensing a vehicle condition;

determining a discrete desired profile of delivery pressures to be delivered from a delivery port of the multi-pressure valve to the single braking circuit based on the vehicle condition; and transmitting a pattern of control signals including respective sub-control signals to the sub-valves, the sub-control signals setting the sub-valves between respective first and second states, for causing the multi-pressure valve to deliver the pressurized fluid from the delivery port of the multi-pressure valve to the single braking circuit in the discrete desired profile of delivery pressures, the transmitting step including:

transmitting the control signal to set a first of the sub-valves to a second state and to maintain a second of the sub-valves in a first state to achieve a continuous full pressure profile application of the fluid at the delivery port;

transmitting the control signal to maintain the first sub-valve in a first state and to set the second sub-valve to a second state to achieve a continuous reduced pressure profile application of the fluid at the delivery port;

transmitting the control signal, along with subsequent control signals, to maintain the first sub-valve in the state and to alternately set the second sub-valve between the first state and the second state to achieve a stepped-up pressure profile application of the fluid at the delivery port; and transmitting the control signal, along with subsequent control signals, to set the first sub-valve to the second state and to maintain the second sub-valve in the first state until the full pressure is achieved at the delivery port, the controller then transmitting additional control signals to alternately set the first sub-valve between the first and second states and to maintain the second sub-valve in the first state until a reduced pressure is achieved at the delivery port to achieve a stepped-down pressure profile application of the fluid at the delivery port.

18. The method for controlling delivery pressure of a fluid to a vehicle system as set forth in claim 17 wherein the transmitting step includes:

setting only one of the sub-valves to the respective second state at a time.

* * * * *